US012601140B2

(12) United States Patent
Anderson et al.

(10) Patent No.: US 12,601,140 B2
(45) Date of Patent: Apr. 14, 2026

(54) AUTOMATICALLY STEERING A MOBILE MACHINE

(71) Applicant: Caterpillar Inc., Peoria, IL (US)

(72) Inventors: Randall T. Anderson, Peoria, IL (US); Bradley P. Krone, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1050 days.

(21) Appl. No.: 17/657,385

(22) Filed: Mar. 31, 2022

(65) Prior Publication Data

US 2023/0313490 A1     Oct. 5, 2023

(51) Int. Cl.
| *E02F 3/84* | (2006.01) |
| *E02F 3/76* | (2006.01) |
| *G05D 1/00* | (2024.01) |

(52) U.S. Cl.
CPC ............ *E02F 3/841* (2013.01); *E02F 3/7613* (2013.01); *G05D 1/0094* (2013.01); *G05D 1/021* (2013.01)

(58) Field of Classification Search
CPC .............. G05D 1/646; G05D 2105/05; G05D 2107/90; G05D 2109/10; E02F 3/7618; E02F 3/844; E02F 9/2087
See application file for complete search history.

(56) References Cited

U.S. PATENT DOCUMENTS

| 4,565,257 | A | | 1/1986 | Hanson | |
|---|---|---|---|---|---|
| 5,503,232 | A | | 4/1996 | Matsushita et al. | |
| 5,918,682 | A | | 7/1999 | Fan et al. | |
| 6,041,870 | A | * | 3/2000 | Zimmerman | E02F 3/7618 |
| | | | | | 172/811 |
| 6,062,317 | A | * | 5/2000 | Gharsalli | E02F 3/845 |
| | | | | | 701/50 |
| 6,167,982 | B1 | | 1/2001 | Dillon | |
| 9,242,669 | B2 | | 1/2016 | Shuler | |
| 9,783,955 | B1 | * | 10/2017 | Clar | E02F 9/262 |
| 10,066,367 | B1 | * | 9/2018 | Wang | E02F 9/262 |
| 2015/0298731 | A1 | * | 10/2015 | Shuler | B62D 6/00 |
| | | | | | 701/41 |
| 2018/0355587 | A1 | * | 12/2018 | Hashimoto | E02F 3/844 |
| 2022/0282451 | A1 | * | 9/2022 | Ready-Campbell | |
| | | | | | G05D 1/0038 |

FOREIGN PATENT DOCUMENTS

WO     2021168512 A1     9/2021

* cited by examiner

*Primary Examiner* — Faris S Almatrahi
*Assistant Examiner* — Moises Gasca Alva

(57) ABSTRACT

A method for steering a mobile machine includes automatically steering the mobile machine in a track steering mode, determining a load condition of the mobile machine, and automatically steering the mobile machine in the track steering mode and a blade steering mode, simultaneously, based on the load condition of the mobile machine.

19 Claims, 4 Drawing Sheets

AUTOMATICALLY STEERING A MOBILE MACHINE

TECHNICAL FIELD

The present disclosure relates generally to automatic steering of mobile machines, and more particularly, to automatically steering a mobile machine in a track steering mode and a blade steering mode simultaneously.

BACKGROUND

Various methods are known for steering a mobile industrial machine, for example, a bulldozer. As is known, bulldozers and other mobile machines may steer in a track steering mode in which a differential speed between the left and right tracks of the bulldozer is used to steer the bulldozer. Additionally, bulldozers may steer in a blade steering mode in which a load on the vehicle body (e.g., via the blade) may be used to steer the bulldozer.

U.S. Pat. No. 5,503,232 ("the '232 patent") describes a steering system for a bulldozer that includes a steering direction indicator (e.g., a steering lever) for indicating a steering direction of a vehicle and a detector for determining whether or not the bulldozer is operating in a bulldozing mode. The '232 patent teaches a steering control unit that steers the vehicle in a lateral direction using a blade tilt steering mode or by causing a difference in the relative speeds of left and right tracks of the vehicle when light load occurs on the bulldozer. However, the '232 patent does not teach using blade tilt steering and track steering simultaneously when a bulldozer may be under heavy load. Hence, bulldozers and other heavy equipment may cease to operate using a relative speed difference between right and left crawler belts and using offset load created by blade tilt when a load increases above a predetermined value, creating steering problems for operators of heavy machinery.

The features of the present disclosure may solve one or more of the problems set forth above and/or other problems in the art. The scope of the current disclosure, however, is defined by the attached claims, and not by the ability to solve any specific problem.

SUMMARY

In one aspect, a method for steering a mobile machine includes automatically steering the mobile machine in a track steering mode, determining a load condition of the mobile machine, and automatically steering the mobile machine in the track steering mode and a blade steering mode, simultaneously, based on the load condition of the mobile machine.

In another aspect, method for automatically steering a tractor with a track-type system to follow a grade line includes automatically steering the tractor in a track steering mode, initiating a blade steering mode based on a load condition of the tractor, and automatically steering the tractor in the track steering mode and the blade steering mode, simultaneously, to follow the grade line based on the load condition of the tractor.

In yet another aspect, a system for automatically steering a mobile machine in both a track steering and blade steering mode, simultaneously, includes a left track and a right track, a blade, a steering module that receives an input from an automatic steering control switch, and a controller. The controller may be configured to automatically steer the mobile machine in a track steering mode, initiate a blade steering mode based on a load condition of the mobile machine, and automatically steer the mobile machine in the track steering mode and the blade steering mode, simultaneously, based on the load condition of the mobile machine.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
FIG. 1 depicts a mobile machine including a system for automatically steering in a track steering mode and a blade steering mode, simultaneously, according to aspects of the disclosure.

FIG. 1 illustrates a mobile machine 101 (which may be referred to simply as "the mobile machine" or "the machine") including a system 100 for automatically steering the mobile machine 101 in a track steering mode and a blade steering mode simultaneously based on a load of the mobile machine 101. The mobile machine 101 may include an electronic control module 102 which may be configured to control one or more aspects of the system 100 as described in greater detail herein, especially with respect to FIG. 2. Still referring to FIG. 1, the mobile machine 101 may further include a steering module 103, a left track 104, a right track 106, a blade 108, a steering joystick 110, an articulation control joystick 112 (for manipulation of an implement (e.g., the blade 108)), and a sensor system 114 for sensing a position, velocity, acceleration, or other aspect of the mobile machine 101. The steering joystick 110 may include an automatic control switch 118 (best shown in FIG. 2). The steering joystick 110 may be used to steer the mobile machine 110 in the manual control mode and may include one or more positions or speed selections (e.g., "forward," "neutral," "reverse," etc.) and the mobile machine 101 may be placed in an automatic or autonomous steering mode using, for example, the automatic control switch 118. In embodiments, the machine may utilize a track steering and a blade steering mode when the automatic control switch 118 is used to place the machine in an autonomous mode as described in greater detail herein.

The mobile machine 101 may be a track-type tractor such as a bulldozer, a motor grader, or other heavy industrial equipment capable of performing one or more of grading, excavation, bulldozing, or other industrial functions. In some embodiments, the mobile machine 101 may include one or more other steerable traction devices, and in some embodiments, the machine may have more than two tracks, such as, for example, a quad-tractor. The mobile machine 101 may be configured to seat an operator in a cabin 116, where an operator may be capable of controlling one or more of the steering joystick 110, the articulation control joystick 112, or other control for moving the mobile machine 101 or utilizing one or more of its features.

The left track 104 and the right track 106 of the mobile machine 101 may be configured to propel and steer the mobile machine 101 in both the autonomous and manual steering modes. For example, the left track 104 and the right track 106 may steer the mobile machine 101 by creating a differential rotational velocity between the left track 104 and the right track 106 of the mobile machine 101. The commands for creating the differential rotational velocity may be based on manual operation (e.g., a driver of the machine) or automatic operation (e.g., a controller such as the ECM 102).

In the manual steering mode, a driver may steer the machine using the steering joystick 110 and/or the articulation control joystick 112. Moving the steering joystick 110 forward may cause the mobile machine 101 to move forward and moving the steering joystick 110 may cause the mobile machine 101 to move backwards, for example. Turning the steering joystick 110 left or right may cause the mobile machine 101 to turn left or right, for example. The steering joystick 110 may be configured to control operation of the left track 104 and the right track 106. The mobile machine 101 may be configured to create a turning radius by changing the relative motion between the tracks. For example, the machine may be steered using one or more of counter rotation, brake steering, a power turn method, and a neutral steer method. That is, moving the steering joystick 110 may cause the tracks to move the machine 101 forward, reverse, or to turn.

In some embodiments, an operator may use other methods to steer the mobile machine 101. For example, with the machine under load (e.g., pushing dirt with the blade 108) an operator may steer the mobile machine 101 by changing a pitch, roll, or yaw of the blade 108 to change the applied forces on the machine to steer the machine. The pitch, roll, and yaw may refer to lifting, tilting (rotating the implement (i.e., counterclockwise or clockwise) about the longitudinal centerline of the machine), and angling (forward and reverse with respect to a longitudinal centerline of the machine), respectively. As the mobile machine 101 is operated and the blade 108 comes under load, forces on the blade 108 may cause the mobile machine 101 to alter its course (e.g., at a magnitude proportional to the force of the load). Hence, the operator may spin or lift the blade 108 (e.g., a right or left corner of the blade 108) to push more or less constituent with a portion of the blade 108 to cause the machine to turn. Additionally, the blade steering mode may be automatically implemented as described in greater detail herein.

In some embodiments, the mobile machine 101 is configured to steer autonomously. The machine 101 may be configured to autonomously steer, for example, to follow a grade line or other feature of a work site, which features may be stored, for example, in a memory or module of the ECM 102. In a grade line following (or feature following) mode, the coordinates of a grade line or feature may be uploaded and/or known (e.g., stored in one or more memories) by the control system of the mobile machine 101 and may be automatically followed as the machine 101 automatically steers around a work site. Autonomous operation may be selectively implemented by the user of the machine 101 or may be automatically entered (e.g., based on a location of the machine with respect to a feature of a work site as described in greater detail herein). In some embodiments, the operator may place the machine 101 in an automatic steering mode by, for example, placing the automatic control switch 118 in an automatic position. With the automatic control switch 118 in the automatic position, the mobile machine 101 may automatically steer left and right (e.g., with respect to a grade line or other feature of a work site) while traveling in the forward or reverse directions.

Because it may be difficult for the machine 101 to automatically follow a grade line to a desired level of precision in a track steering mode only, the machine 101 may use the track steering mode and the blade tilt steering mode simultaneously to follow a grade line. More precisely, the machine 101 may use a track steering mode when the machine is under a light load, and when the machine comes under heavy load, the machine 101 may initiate a blade steering mode while maintaining the track steering mode in operation.

The mobile machine 101 may be configured to autonomously steer in the track steering mode using one or more steering methods for creating a turning radius. For example, the machine may be autonomously steered using one or more of counter rotation, brake steering, a power turn method, and a neutral steer method.

The mobile machine 101 may further be configured to autonomously steer in a blade steering mode based on one or more factors, including a normalized pull weight of the mobile machine 101. The normalized pull weight may be calculated, for example, based upon at least a coefficient of traction, a machine pitch, a transmission output torque, and a machine weight and these may be based on one or more inputs to the machine to calculate the normalized pull weight as described in greater detail herein. When in the blade steering mode, the machine may automatically control one or more of the pitch, roll, or yaw of its implement (e.g., the blade 108) to offset a load on the implement (and hence the machine body) to steer the machine. That is, if it is difficult for the machine to continue to steer its course under a given load, it may automatically adjust a position of the blade 108 (e.g., by rotating the blade 108 clockwise or counterclockwise to push more constituent with a portion of the blade 108) to push more constituent (i.e., encounter a heavier load) with a portion of the blade 108 and correct course, turning left or right to the direction of the increased force on the blade. Blade tilt steering may be used particularly in a scenario in which fine turns or movements of the machine are necessary to stay on a grade line or to follow a track of a site plan.

Figure 2:
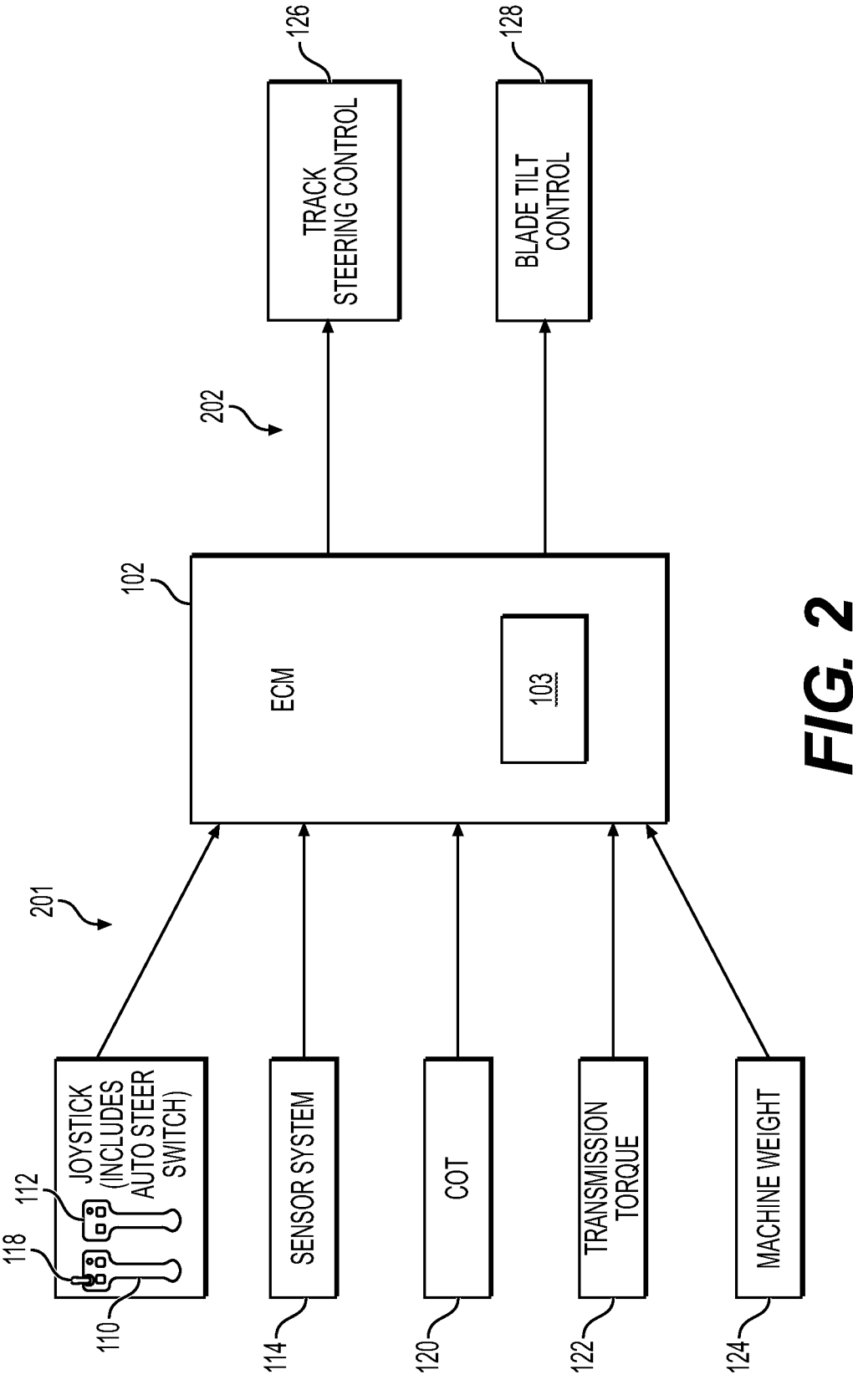
FIG. 2 depicts an electronic controller for the mobile machine of FIG. 1.

Referring now to FIG. 2, the electronic controller (ECM) 102 is shown in greater detail. The ECM 102 includes inputs 201 and outputs 202. The inputs 201 may include the steering joystick 110 (which may include the automatic control switch 118), the articulation control joystick 112, the sensor system 114, a coefficient of traction (COT) module 120, a transmission torque module 122, and a machine weight module 124. The outputs 202 may include a track steering control signal 126 and a blade tilt control signal 128.

The ECM 102 may comprise a data processor, a microcontroller, a microprocessor, a digital signal processor, a logic circuit, a programmable logic array, or one or more other devices for controlling the system 100 in response to one or more of the inputs 201. ECM 102 may embody a single microprocessor or multiple microprocessors that may include executable instructions, programs, software code, or other logic-based instructions for automatically steering a mobile machine in a track steering mode and a blade steering mode simultaneously based on a load on the machine. For example, the ECM 102 may include a memory, a secondary storage device, and a processor, such as a central processing unit or any other means for accomplishing a task consistent with the present disclosure. The memory or secondary storage device associated with ECM 102 may store data and/or software routines that may assist ECM 102 in performing its functions, such as the functions of the exemplary control process 300 described with respect to FIG. 3. Further, the memory or secondary storage device associated with ECM 102 may also store data received from various inputs associated with the system 100. Numerous commercially available microprocessors can be configured to perform the functions of ECM 102. It should be appreciated that ECM 102 could readily embody a general machine controller capable of controlling numerous other machine functions. Alternatively, a special-purpose machine controller could be provided. Further, ECM 102, or portions thereof, may be located remote from the mobile machine 101. Various other known circuits may be associated with ECM 102, including signal-conditioning circuitry, communication circuitry, hydraulic or other actuation circuitry, and other appropriate circuitry.

The steering joystick 110 and the articulation control joystick 112 may control instructions that generate, for example, pilot or electro-hydraulic signals that control operation of one or more pumps, motors, or valves of a hydraulic system that may operate one or more steering actuators and/or articulation actuators, as is well known in the art. In some embodiments, the steering joystick 110 and the joystick 112 may be inputs to or receive outputs from the steering module 103. The steering module 103 may send one or more control signals to the steering systems of the mobile machine 101 (e.g., the left track 104, the right track 106, the blade 108, and other systems or components) to steer the mobile machine 101. Mobile machines equipped with twin tracks may be configured to rotate one or more of the left and right tracks or other portions of their undercarriages at different speeds and/or in opposite directions in order to steer the tractor in a manual or an automatic steering mode. Operators or the automatic controls of the mobile machine 101 may utilize multiple methods to turn the mobile machine 101 such as, for example, counter rotation, brake steer, power turn, neutral steer, and other methods. In some embodiments, the steering module 103 may generate commands that turn a hydrostatic drive, a clutch and brake drive system, a differential steering system, or a hydrostatic steering system, which may use a hydraulic steering motor.

Still referring to FIG. 2, the sensor system 114 may include one or more sensors, inertial measurement units (IMUs), global positioning system (GPS) signals, virtual sensors, or other signals capable of determining a location, direction, and speed. Additionally, sensor system 114 may include any type of sensor known in the art, including, for example, potentiometers, extension sensors, proximity sensors, angle sensors, and the like. The sensor system 114 may include sensors configured to monitor machine travel speed, for example, sensors associated with any of the left track 104, the right track 106, axle shafts, motors, or other components of the drive train. In some embodiments, the sensor system 114 may be configured to measure a force on the blade 108 (FIG. 1), such as a load on the blade 108 created by moving constituent with the blade 108.

The coefficient of traction module 120 may calculate a coefficient of traction based on one or more inputs (not shown) that may measure the ability of the mobile machine 101 to generate a tractive force with the left track 104 and the right track 106 (FIG. 1), respectively. The mobile machine 101 may generate a tractive force by pushing against soil or other constituent beneath the tracks of the machine (here simplified as merely "soil," but it is to be understood the machine could be operated on any surface, which would have differing coefficient of traction based on its characteristics). The tractive force may require an equal and opposite horizontal reaction by the soil against the driving tracks of the tractor and may result in slip or lost motion. The reaction force may effectively determine tractor performance and steering capability may be predicted based on one or more soil strength parameters and soil deformation corresponding to the track characteristics of the machine.

The transmission torque module 122 may measure a transmission torque of a transmission of the mobile machine 101. The transmission torque module 122 may use, for example, uses a strain gauge, a piezoelectric member, or a piezoresistive member, or other device or sensor for determining transmission torque. The transmission torque module 122 may be associated or configured to measure transmission torque at a transmission of the mobile machine 101, one or more torque converters, one or more drivetrains, one or more drive motors, and one or more crankshafts of the mobile machine 101. The transmission torque module 122 may be configured to measure transmission torque at a transmission input or output shaft, or may be associated with a torque converter input shaft, a torque converter's output shaft, or both, where the torque converter is coupled to a transmission input or input shaft. In some embodiments, the transmission torque module 122 may measure transmission torque using one or more magnetic transducers, a combination of a magnetic sensors and a one or more magnets, or a combination of a magneto-restrictive sensors and one or more magnets. The transmission torque module 122 may include one or more torque calculators for estimating the torque applied to one or more tracks or other steerable traction devices of the mobile machine 101. The transmission torque module 122 may be configured to provide an indication of current gear or output ratios provided by data associated with operator controls for the transmission (not shown).

The machine weight module 124 may be configured to measure a machine weight of the mobile machine 101. The machine weight module 124 may utilize one or more strain gauges, piezoelectric members, piezoresistive members, or other devices or sensors for determining the machine weight. In some embodiments, the machine weight module 124 may input a predetermined value of the machine weight based on a static input of machine weight, which may be, for example, stored in the ECM 102, downloaded from an external storage to which the ECM 102 may be communicatively coupled, and/or retrieved from another storage.

Based on the inputs 201 to the ECM 102, the ECM 102 may control the steering of the mobile machine 101 automatically using one or more of the track steering control signal 126 and the blade tilt control signal 128. In some embodiments, the mobile machine 101 may be steered in a grade line following mode or a straight line mode, as described in greater detail herein.

The track steering control signal 126 may adjust the speed of the left track 104 and the right track 106 individually to control the steering of the mobile machine. The track steering control signal 126 may cause the tracks to, for example, counter rotate, to rotate at different speeds, or to neutral steer to cause the mobile machine 101 to turn. The track steering control signal 126 may be an input to the steering module 103, which may generate commands that turn a hydrostatic drive, a clutch and brake drive system, a differential steering system, or a hydrostatic steering system, which may use a hydraulic steering motor, as described in greater detail herein.

The blade tilt control signal 128 may control motion of the blade 108 to move the blade 108 such that it reacts with more or less constituent to increase or decrease the force on a particular portion of the blade 108. Changing the force on a portion of the blade 108 increases or reduces the torque on the machine in a particular direction with respect to the longitudinal axis of the machine and may cause the machine to turn in the direction of the increased torque. Hence, the mobile machine 101 can be steered with blade control signals which change the pitch of the blade 108.

Figure 3:
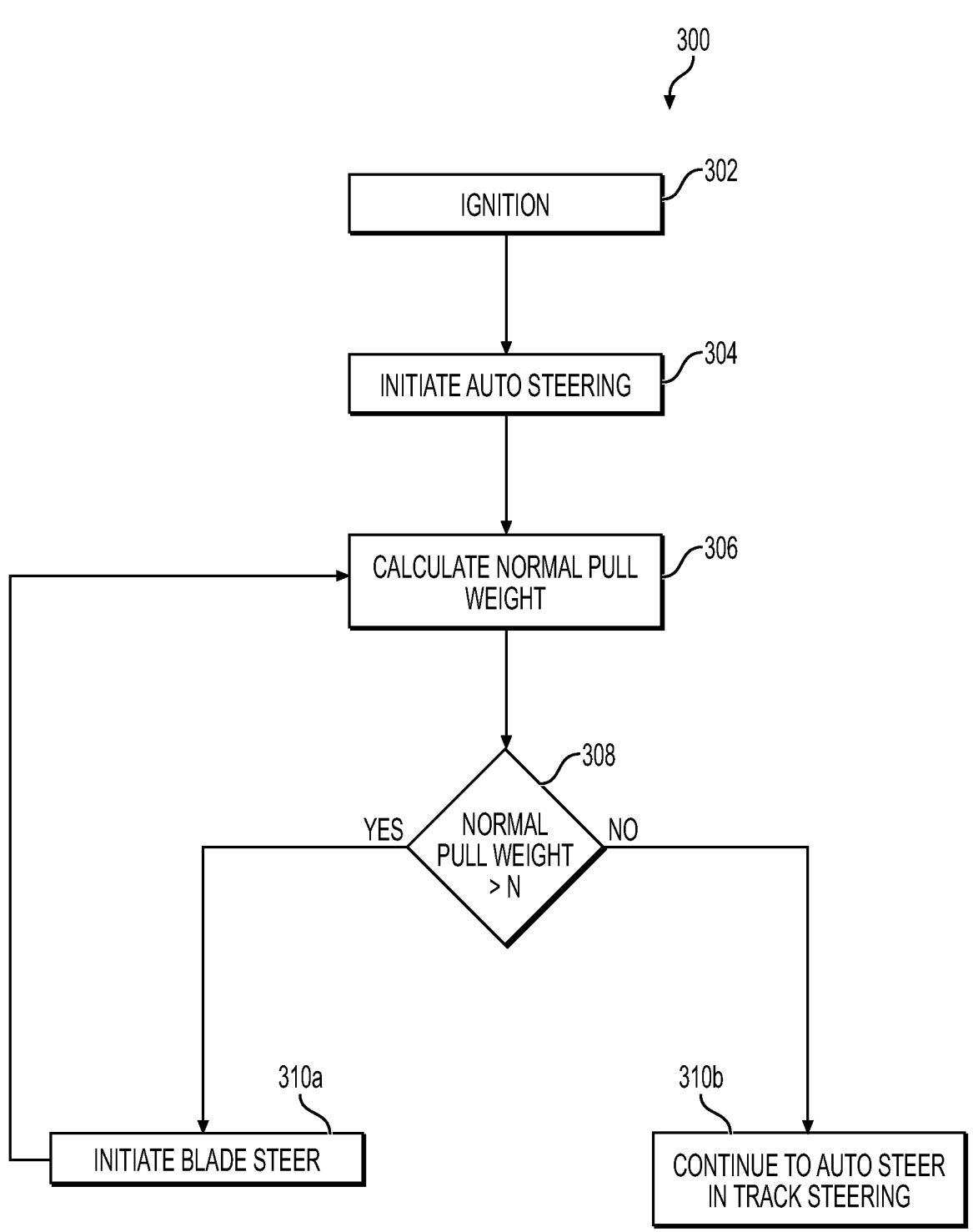
FIG. 3 depicts a flow chart for implementing one or more of the processes of the electronic controller of FIG. 2.

Referring now to FIG. 3, an exemplary control process 300 for automatically steering the mobile machine 101 in a track steering mode and a blade steering mode simultaneously, as executed by the ECM 102, is shown. The control process may begin at step 302 IGNITION, at which point an operator may start the mobile machine for automatically steering in a track steering mode and a blade steering mode simultaneously. During machine operation, the operator may operate in a manual control mode, using the steering joystick 110 and the articulation control joystick 112 to manually steer the machine based on control signals from the joysticks. However, at some point, the operator may determine to operate the machine in an automatic steering mode, at which point the operator may INITIATE AUTO STEERING as depicted at step 304. In some embodiments, to initiate auto steering, the operator may drive the mobile machine 101 to within a capture range of a grade line and auto steering may initiate automatically when the mobile machine 101 is within the capture range or may initiate when the operator selects an "automatic" operation mode (or "forward" or "reverse") with the automatic control switch 118 and the mobile machine 101 is within the capture range of the grade line.

With auto steering initiated, the machine may begin to automatically steer in a track steering mode as described in greater detail herein. The machine may automatically steer in a straight line mode (i.e., following a straight line (or a line of infinite radius of curvature)) or in a grade line following mode, in which the machine automatically follows a grade line. The grade line may be determined from a computer-aided drawing (CAD) program or other software and uploaded to an onboard computer of the mobile machine 101. In some embodiments, the grade lines may be determined automatically through the use of overhead imagery or other imagery or site plans input into the system 100.

Eventually, the machine may come under load (e.g., the blade 108 may begin to move constituent). As the blade 108 engages a load, the sensor system 114 may calculate a load on the blade 108 (which may be referred to as a "pull weight" or a "normalized pull weight") at step 306. The normalized pull weight may be based on one or more factors as described in greater detail herein. For example, the normalized pull weight may be calculated based on, at least, a coefficient of traction, a machine pitch, a transmission output torque, and a machine weight. The coefficient of traction, machine pitch, transmission output torque, and machine weight may be calculated or otherwise determined by the system 100.

At step 306, the machine may compare the normalized pull weight to a dual steering mode initiation value. In some embodiments, the dual steering mode initiation value is a predetermined and stored value that is input to the ECM 102 before operation of the machine. For example, the dual steering mode initiation value may be stored in a memory or storage of the ECM 102 or, for example, in one or more of the modules communicatively coupled to the ECM 102 or the ECM 102 itself. Based on the comparison of the normalized pull weight with the dual steering mode initiation value, the machine may begin automatically steering in the track steering mode and the blade steering mode simultaneously.

That is, if the normalized pull weight is greater than the dual steering mode initiation value, as depicted at step 308*a*, the machine may initiate a dual steering mode using both the track steering mode and the blade steering mode simultaneously. In certain machines, it may be difficult to automatically steer using only the track steering mode under heavy load. Hence, the machine may initiate blade steering to lower the side of the blade of intended steering direction further into the ground the blade 108 (e.g., by turning the blade clockwise or counterclockwise to push more constituent with a loaded side of the blade 108), thus causing the machine to steer automatically along its predetermined path. In some embodiments, the predetermined path may be, for example, to follow a grade line (i.e., a grade line following mode of automatic steering). Hence, the automatic steering of the mobile machine 101 may be based on a proximity of the mobile machine 101 to the grade line. In other embodiments, the predetermined path may be a straight line (i.e., a straight line following mode of automatic steering).

In some embodiments, the dual steering mode initiation value may be a fraction of the maximum normalized pull weight (N_max) of the mobile machine 101. That is, the system 100 may be configured such that at 1/x*(N_max), the machine begins to auto steer in the dual steering mode where x is a number equal to or greater than 1. In some embodiments, the machine may begin dual steering at ½ N_max, ¼ N_max, or some other fraction of N_max (e.g., ⅛ N_max, etc.). In some embodiments, the dual steering mode initiation value is based on a predetermined value that is determined before initiation of the mobile machine. In other embodiments, the dual steering mode initiation value may be changed by an operator of the system as the mobile machine 101 is in use.

In some embodiments, the proportion of the steering may be apportioned out by the controller such that the mobile machine 101 uses either the track steering mode or the blade steering mode to conduct the majority of its autonomous steering. For example, with a constituent load above N_max, the mobile machine 101 may be configured (via the ECM 102, for example) to conduct the majority of its steering in a blade steering mode. In other embodiments, the mobile machine 101 may be configured to conduct the majority of its steering in a track steering mode.

Still referring to FIG. 3, as the mobile machine 101 continues to push constituent, the load on the blade 108 may decrease below the dual steering mode initiation value of the mobile machine 101. When the normalized pull weight decreases below the dual steering mode initiation value, the system 100 may discontinue steering the mobile machine 101 in the simultaneous track steering mode and the blade steering mode. That is, after dual steering mode has been initiated, the system 100 may return to step 306 to recalculate the normalized pull weight and then compare the normalized pull weight to the dual steering initiation value at step 308. If the load has decreased below the dual steering mode initiation value, the system 100 may cease steering in both the blade steering and track steering modes and may begin steering in only the track steering mode at step 310*b*. That is, the system 100 may automatically steer the mobile machine in only the track steering mode based on a decreased load condition of the mobile machine 101.

Additionally, in some embodiments, the mobile machine 101 may be configured to cease automatically steering in either the track steering mode or the dual steering mode based on an operator input, for example, a manual input from either the steering joystick 110 or the articulation control joystick 112. If for example, an operator steers the mobile machine 101 using either the joystick 110 or the articulation control joystick 112, the system 100 may receive the operator's input and may cancel any automatic steering signal or the manual steering signal may override the automatic steering signal such that the mobile machine ceases to operate in an automatic dual steering mode. In some embodiments, operator input to the articulation control joystick 112 may simply cause the mobile machine 101 to stop operating in the dual steering mode and the mobile machine 101 may continue to automatically steer in the track steering mode without automatically operating in the blade steering mode.

INDUSTRIAL APPLICABILITY

The disclosed aspects of the mobile machine 101 of the present disclosure may be used to steer the mobile machine 101 automatically to follow a grade line. For example, with reference to FIGS. 1 and 4, the mobile machine 101 is depicted in a side view and in a birdseye view operating in an automatic steering mode following a grade line 400. The mobile machine 101 in FIG. 1 is following the grade line 400 from a first position 402 to a second position 404 and a third position 406, steering in an autonomous mode. Along the grade line 400, the mobile machine 101 encounters a load 410 of constituent (e.g., dirt) at the second position 404. The load 410 may cause the mobile machine 101 to veer to the left as the blade 108 encounters the constituent. Hence, the machine may encounter difficulty automatically steering to maintain its track along the grade line 400 using only the track steering mode. That is, the mobile machine 101 may begin to turn to the left, away from its intended track following the grade line 400 due to the weight of the load.

As it experiences heavier load, the mobile machine 101 may recalculate its normalized pull weight. If the normalized pull weight is greater than the dual steering mode initiation value, the machine may initiate the blade steering mode in addition to the track steering mode. Hence, at the second position 404, the mobile machine 101 initiates dual steering mode using both the track steering mode and the blade steering mode to steer to follow the grade line 400 and the ECM 102 may send both track steering signals 126 and blade tilt control signals 128 to steer the mobile machine 101 with a differential speed between the left track 104 and right track 106 and using the blade 108. More specifically, the mobile machine 101 may automatically turn the blade 108 clockwise to lower a right side of the blade further into the ground on the right side (i.e., in the intended steering direction). This automatic turn of the blade further into the ground may correct the course of the machine, allowing it to continue its right turn along the grade line 400.

Figure 4:
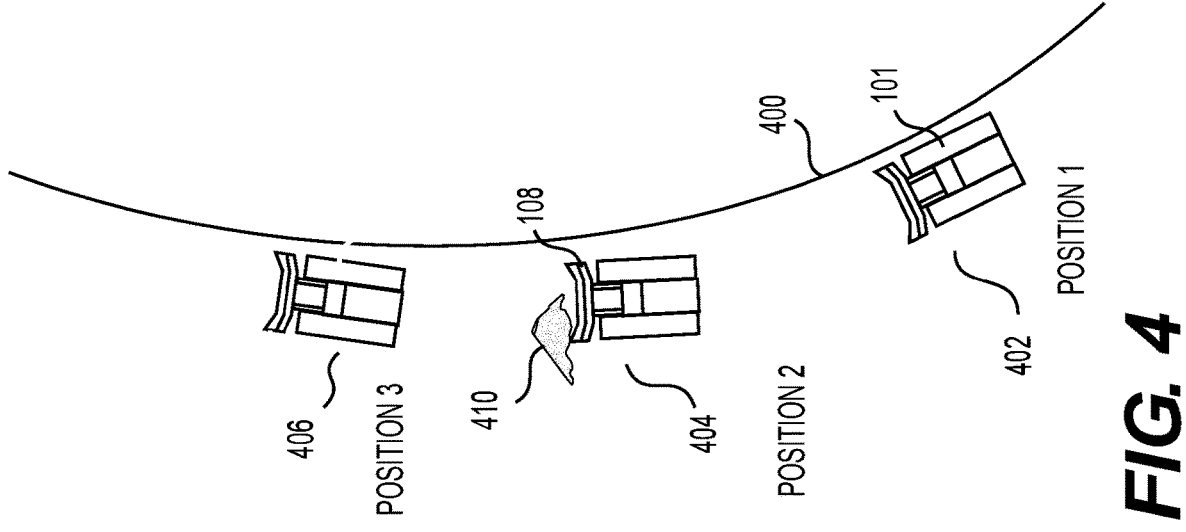
FIG. 4 depicts a birdseye view of the mobile machine of FIG. 1 following a grade line and operating in a track steering mode and a blade steering mode, simultaneously.

Still referring to FIGS. 1 and 4, between position 2 and position 3 (corresponding to locations 404 and 406, respectively), the machine loses some or all of the load 410 on the left side of the blade 108 and the normalized pull weight of the machine decreases. Hence, it is possible for the mobile machine to steer itself automatically in only the track steering mode. That is, the normalized pull weight may decrease below the dual steering mode initiation value and so the machine may cease to steer automatically in both the track steering and blade steering modes.

It should now be understood that under certain conditions (e.g., heavy load), a mobile machine configured to operate automatically in only a track steering mode or a blade steering mode individually, may not be optimally configured to automatically steer the mobile machine under heavy load. Embodiments of the present disclosure may reduce steering difficulties encountered when transitioning from track steering to blade steering by maintaining a track steering capability when a blade steering capability is initiated. Because stopping track steering and starting blade steering can be difficult to coordinate, embodiments described herein may provide for a better transition between steering modes by continued use of a track steering mode, even while a blade steering mode is utilized.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for steering a mobile machine, comprising:
automatically steering the mobile machine in a track steering mode;
determining a load condition of the mobile machine;
calculating a normalized pull weight of the mobile machine based on the load condition of the mobile machine;
comparing the normalized pull weight to a dual steering mode initiation value; and
automatically steering the mobile machine in the track steering mode and a blade steering mode, simultaneously, based on the load condition of the mobile machine and based on the comparison between the normalized pull weight and the dual steering mode initiation value.

2. The method of claim 1, wherein the load condition at which the mobile machine is steered in the track steering mode and the blade steering mode, simultaneously, is a higher load condition than a load condition at which the mobile machine is steered in only the track steering mode.

3. The method of claim 1, wherein automatic steering of the mobile machine is based on a proximity of the mobile machine to a grade line.

4. The method of claim 1, wherein the mobile machine includes a cabin, a left track, a right track, and a blade positioned forward of the cabin, the left track, and the right track, and wherein the load condition is a function of an amount of constituent displaced with the blade of the mobile machine.

5. The method of claim 1, wherein the dual steering mode initiation value is a fraction of a maximum normalized pull weight of the mobile machine.

6. The method of claim 1, wherein the normalized pull weight is calculated based on one or more of a coefficient of traction, a machine pitch, a transmission output torque, or a machine weight.

7. The method of claim 1, wherein the dual steering mode initiation value is determined before initiation of the mobile machine.

8. The method of claim 1, further comprising discontinuing simultaneous automatic steering of the machine in the track steering mode and the blade steering mode based on an operator input.

9. The method of claim 8, wherein the operator input includes moving one or more of a steering joystick or an implementation manipulation joystick.

10. The method of claim 1, wherein when the mobile machine automatically steers in the track steering mode and the blade steering mode, simultaneously, a majority of the steering is in the blade steering mode.

11. The method of claim 1, further comprising:
automatically steering the mobile machine in only the track steering mode based on a decreased load condition of the mobile machine, compared to the load condition at which the mobile machine is steered in the track steering mode and the blade steering mode, simultaneously.

12. A method for automatically steering a tractor with a track-type system to follow a grade line, comprising:
automatically steering the tractor in a track steering mode, wherein the tractor includes a cabin, a left track, a right track, and a blade positioned forward of the cabin, the left track, and the right track;
initiating a blade steering mode based on a load condition of the tractor, wherein the load condition of the tractor is based on a measured load on the blade; and
calculating a normalized pull weight of the tractor based on the load condition of the mobile machine;
comparing the normalized pull weight to a dual steering mode initiation value; and
automatically steering the tractor in the track steering mode and the blade steering mode, simultaneously, to follow the grade line based on the load condition of the tractor and based on the comparison between the normalized pull weight and the dual steering mode initiation value.

13. The method of claim 12, wherein when the tractor automatically steers in the track steering mode and the blade steering mode, simultaneously, a majority of the steering is in the blade steering mode.

14. The method of claim 12, further comprising:
automatically steering the tractor in only the track steering mode based on a decreased load condition of the tractor, compared to the load condition at which the tractor is steered in the track steering mode and the blade steering mode, simultaneously.

15. The method of claim 12, wherein:
the load condition at which the tractor is steered in the track steering mode and the blade steering mode, simultaneously, is a higher load condition than a load condition at which the tractor is steered in only the track steering mode; and
the load condition is a function of an amount of constituent displaced with a blade of the tractor.

16. The method of claim 12, wherein automatically steering the tractor in the track steering mode and the blade steering mode, simultaneously, is based on a proximity of the tractor to the grade line.

17. A system for automatically steering a mobile machine in both a track steering and blade steering mode, simultaneously, the system comprising:
a cabin;
a left track and a right track;
a blade positioned forward of the cabin, the left track, and the right track in a direction of forward travel of the mobile machine;
a sensor system configured to measure a load on the blade;
a steering module that receives an input from an automatic steering control switch; and
a controller configured to:
automatically steer the mobile machine in a track steering mode;
initiate a blade steering mode based on a load condition of the mobile machine based on the measured load on the blade; and
calculate a normalized pull weight of the mobile machine based on the load condition of the mobile machine;
compare the normalized pull weight to a dual steering mode initiation value; and
automatically steer the mobile machine in the track steering mode and the blade steering mode, simultaneously, based on the load condition of the mobile machine and based on the comparison between the normalized pull weight and the dual steering mode initiation value.

18. The system of claim 17, further comprising:
one or more manual controls;
wherein the controller is further configured to:
discontinue automatic steering of the mobile machine in the track steering mode and the blade steering mode, simultaneously, based on operator input to one or more of the manual controls.

19. The system of claim 17, wherein the controller is further configured to:
automatically steer the mobile machine in only the track steering mode based on a decreased load condition of the mobile machine, compared to the load condition at which the mobile machine is steered in the track steering mode and the blade steering mode, simultaneously.

\* \* \* \* \*